United States Patent
Liu

(10) Patent No.: US 12,350,584 B2
(45) Date of Patent: Jul. 8, 2025

(54) SYSTEMS AND METHODS FOR CONTROLLING ADULT TOYS BASED ON GAME RELATED ACTIONS

(71) Applicant: HYTTO PTE. LTD, Singapore (SG)

(72) Inventor: Dan Liu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/817,726

(22) Filed: Aug. 28, 2024

(65) Prior Publication Data
US 2024/0416227 A1 Dec. 19, 2024

Related U.S. Application Data

(63) Continuation of application No. 17/349,752, filed on Jun. 16, 2021, now Pat. No. 12,090,395, and a continuation-in-part of application No. 17/221,823, filed on Apr. 4, 2021, which is a continuation-in-part of application No. 16/369,143, filed on Mar. 29, 2019, now Pat. No. 10,999,608.

(51) Int. Cl.
| | | |
|---|---|---|
| *A63F 13/285* | (2014.01) | |
| *A61H 19/00* | (2006.01) | |
| *G05B 15/02* | (2006.01) | |

(52) U.S. Cl.
CPC .......... *A63F 13/285* (2014.09); *A61H 19/00* (2013.01); *G05B 15/02* (2013.01); *A61H 2201/501* (2013.01)

(58) Field of Classification Search
CPC . A63F 13/285; A61H 19/00; A61H 2201/501; G05B 15/02
See application file for complete search history.

(56) References Cited

U.S. PATENT DOCUMENTS

| | | |
|---|---|---|
| 6,368,268 B1 | 4/2002 | Sandvick et al. |
| 7,446,752 B2 | 11/2008 | Goldenberg et al. |
| 8,089,458 B2 | 1/2012 | Barney et al. |
| 8,308,631 B2 | 11/2012 | Kobashikawa et al. |
| 8,608,644 B1 | 12/2013 | Davig |
| 8,814,688 B2 | 8/2014 | Barney et al. |
| 9,132,058 B2 | 9/2015 | Imboden et al. |

(Continued)

FOREIGN PATENT DOCUMENTS

CN 108418890 A 8/2018

*Primary Examiner* — Omkar A Deodhar
*Assistant Examiner* — Shauna-Kay Hall
(74) *Attorney, Agent, or Firm* — Holtz, Holtz & Volek PC

(57) ABSTRACT

Embodiments of the present disclosure provide systems and methods for operating adult toys based on game related actions. The method performed by a server system includes facilitating an interaction mode between a gaming application and an adult toy management application, for operating an adult toy associated with a user of a plurality of users. The method includes receiving one or more action inputs associated with a character of the gaming application based on the user inputs in the gaming application. The one or more action inputs correspond to game related action associated with the gaming application. Further, the method includes determining a control pattern associated with the game related action performed by the character in the gaming application. The method includes transmitting the control pattern to the adult toy management application, for operating the adult toy to provide physical stimulus to the user corresponding to the game related action.

20 Claims, 14 Drawing Sheets

(56) References Cited

U.S. PATENT DOCUMENTS

| | | |
|---|---|---|
| 9,492,847 B2 | 11/2016 | Goldenberg et al. |
| 9,993,724 B2 | 6/2018 | Barney et al. |
| 10,143,618 B2 | 12/2018 | Cambridge |
| 10,583,357 B2 | 3/2020 | Barney et al. |
| 2002/0065477 A1 | 5/2002 | Boyd et al. |
| 2004/0082831 A1 | 4/2004 | Kobashikawa et al. |
| 2004/0132439 A1 | 7/2004 | Tyagi et al. |
| 2005/0014560 A1 | 1/2005 | Blumenthal |
| 2005/0204287 A1 | 9/2005 | Wang |
| 2007/0197296 A1 | 8/2007 | Lee |
| 2010/0154102 A1 | 6/2010 | Leung et al. |
| 2012/0326976 A1 | 12/2012 | Markovic et al. |
| 2013/0116502 A1 | 5/2013 | Cambridge |
| 2013/0215116 A1 | 8/2013 | Siddique et al. |
| 2014/0178049 A1 | 6/2014 | Kihara et al. |
| 2015/0328082 A1 | 11/2015 | Jiang et al. |
| 2016/0260262 A1 | 9/2016 | Baker et al. |
| 2016/0325179 A1 | 11/2016 | Moir et al. |
| 2018/0185751 A1 | 7/2018 | Kojima et al. |
| 2019/0175441 A1 | 6/2019 | Urbani |
| 2020/0276504 A1 | 9/2020 | Liu |
| 2020/0289363 A1 | 9/2020 | Liu |
| 2021/0291041 A1 | 9/2021 | Pounders |

| PARAMETERS | DESCRIPTION | TYPE | NOTE |
|---|---|---|---|
| COMMAND | TYPE OF REQUEST | STRING | GAME RELATED ACTIONS |
| ACTION | CONTROL THE FUNCTION AND INTENSITY OF THE TOY | STRING | ACTION CAN BE VIBRATE, ROTATE, PUMP |
| TIMESEC | TOTAL RUN TIME | DOUBLE | THE TOTAL TIME SHOULD BE GREATER THAN 1 |
| TOY | ADULT TOY UNIQUE IDENTIFIER | STRING | IDENTIFY THE ADULT TOY DEVICE YOU WANT TO CONTROL |
| NAME | PRESET PATTERN NAME | STRING | / |

FIG. 5

SYSTEMS AND METHODS FOR CONTROLLING ADULT TOYS BASED ON GAME RELATED ACTIONS

CROSS REFERENCE TO RELATED APPLICATIONS

This application is a continuation application of U.S. application Ser. No. 17/349,752, filed Jun. 16, 2021. This application is also a continuation-in-part application of U.S. application Ser. No. 17/221,823, filed Apr. 4, 2021, which is a continuation-in-part application of U.S. application Ser. No. 16/369,143, filed Mar. 29, 2019, and issued as U.S. Pat. No. 10,999,608 on May 4, 2021. Each of the above applications is hereby incorporated by reference in its entirety.

TECHNICAL FIELD

The present disclosure relates to an adult entertainment system and, more particularly relates, to systems and methods for operating adult toys based on external electronics based stimulus.

BACKGROUND

Sexual stimulation can be achieved by an individual or a group of individuals (irrespective of gender) by using adult toys. The adult toys are generally simple and can have a vibration feature for providing sexual stimulation. In conventional adult toys, a degree of sexual stimulation may be manually controlled. However, as these conventional adult toys are self-operated by the individual for experiencing sexual stimulation by using a single setting in the adult toy, the individual may not always feel the same level of stimulation at every instance using the adult toy. Additionally, the arousals of the individual may change periodically based on mood and environment, thus the stimulation produced by the adult toy using the single vibration setting may not satisfy the needs/desires of the individual.

Currently, social media and the ability to extend wireless interfaces, local and wide area networking, etc., have contributed to configurability of the adult toys. These technologies enable the individuals to exchange information using centralized messaging or voice-over-IP services for experiencing sexual stimulation using adult toys. However, exchanging information using these services may not be encouraged by the individual for a long period of time, as it lacks entertainment factors. To overcome the aforesaid limitation, the adult toys may be equipped with some fun elements to improve the users' experience. Particularly, such adult toys can be equipped with additional hardware and software components to provide diverse interaction modes to the individual. However, such adult toys can be expensive and cumbersome in use for ordinary users.

Therefore, there is a need for practical solutions for greater control on adult toys in terms of constant stimulus fed to the adult toys, and for providing a more engaging experience for multiple users in a collaborative environment.

SUMMARY

Various embodiments of the present disclosure provide systems and methods for controlling adult toys based on game related actions.

In an embodiment, a computer-implemented method is disclosed. The computer-implemented method performed by a server system includes facilitating an interaction mode between a gaming application and an adult toy management application, for operating an adult toy associated with a user of a plurality of users. The gaming application and the adult toy management application are installed in a game platform and a user device associated with the user, respectively. The method includes receiving one or more action inputs associated with a character of the gaming application based at least on the user inputs in the gaming application. The one or more action inputs are received from a game application server managing the gaming application. Further, the one or more action inputs correspond to game related action associated with the gaming application. The method further includes determining a control pattern associated with the game related action performed by the character in the gaming application. The method includes transmitting the control pattern to the adult toy management application, for operating the adult toy associated with the user to provide physical stimulus to the user corresponding to the game related action.

In another embodiment, a server system is disclosed. The server system includes a communication interface, a memory storing executable instructions and a processor operatively coupled with the communication interface and the memory. The processor is configured to execute the executable instructions to cause the server system to at least facilitate an interaction mode between a gaming application and an adult toy management application, for operating an adult toy associated with a user of a plurality of users. The gaming application and the adult toy management application are installed in a game platform and a user device associated with the user, respectively. The server system is caused to receive one or more action inputs associated with a character of the gaming application based at least on the user inputs in the gaming application. The one or more action inputs are received from a game application server managing the gaming application. Further, the one or more action inputs correspond to game related action associated with the gaming application. The server system is further caused to determine a control pattern associated with the game related action performed by the character in the gaming application. The server system is caused to transmit the control pattern to the adult toy management application, for operating the adult toy associated with the user to provide physical stimulus to the user corresponding to the game related action.

In yet another embodiment, a computer-implemented method for operating adult toys based on game related actions is disclosed. The computer-implemented method performed by a server system includes facilitating an interaction mode between a gaming application and an adult toy management application, for operating an adult toy associated with a user of a plurality of users. The gaming application and the adult toy management application are installed in a game platform and a user device associated with the user, respectively. The method includes receiving one or more action inputs associated with a character of the gaming application based at least on the user inputs in the gaming application. The one or more action inputs are received from a game application server managing the gaming application. Further, the one or more action inputs correspond to game related action associated with the gaming application. The method further includes determining a control pattern associated with the game related action performed by the character in the gaming application. The control pattern includes one or more parameters related to a total run time including a loop setting, intensity, an operating type of the adult toy, and a unique identifier associated with the adult toy. The method includes transmitting the control pattern to the adult toy management application, for operating the adult toy associated with the user to provide physical stimulus to the user corresponding to the game related action.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers:

FIG. 5 illustrates an example representation of a table depicting parameters associated with a control pattern, in accordance with an example embodiment of the present disclosure;

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present invention are described hereinafter with reference to FIG. 1 to FIG. 10.

Figure 1:
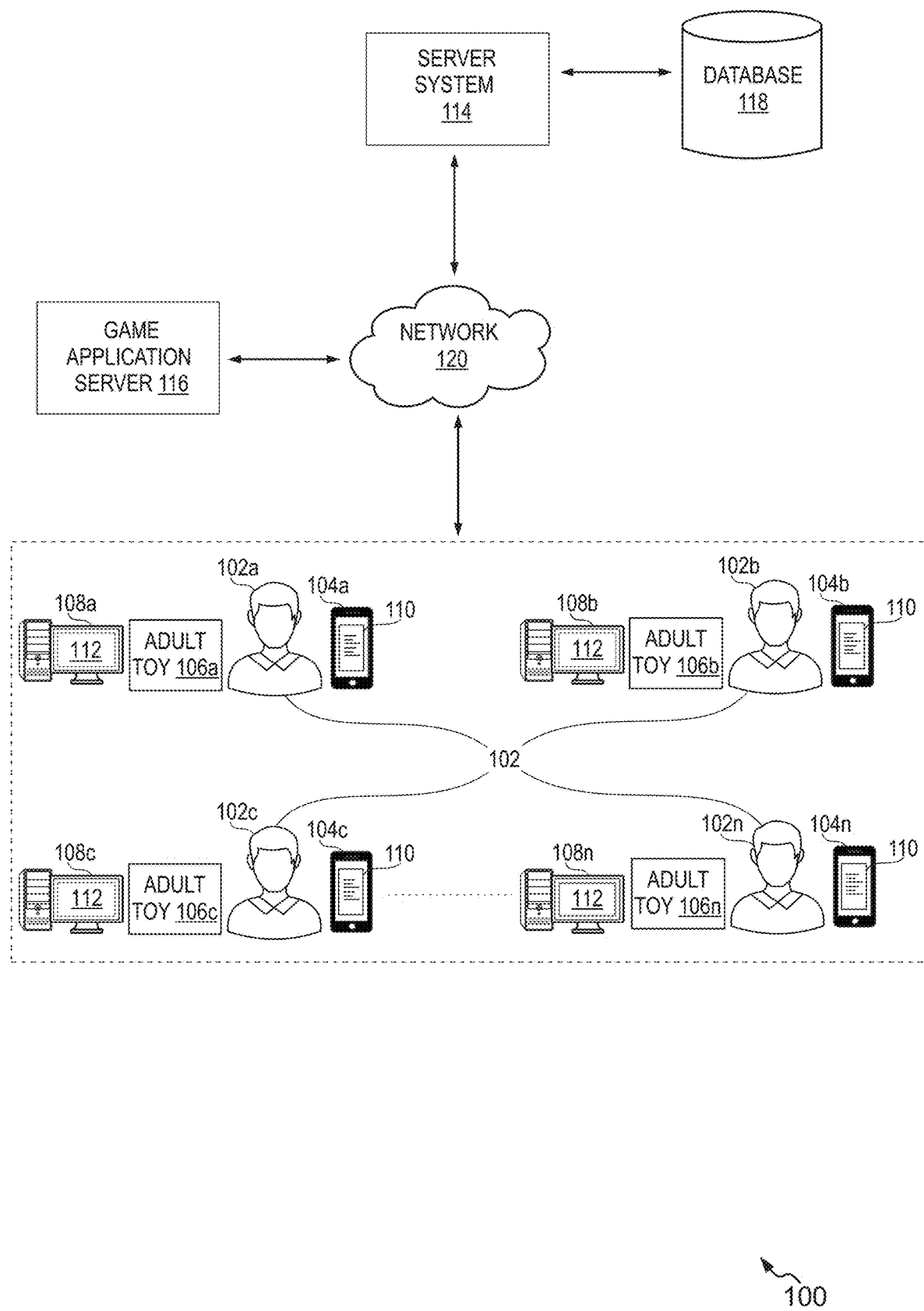
FIG. 1 illustrates an example representation of an environment related to at least some embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of users 102 (collectively referred for a user 102a, a user 102b, a user 102c through a user 102n). Each user of the plurality of users 102 is associated with an electronic device, such as a user device 104a, a user device 104b, a user device 104c through a user device 104n and a game platform such as, a game platform 108a, a game platform 108b, a game platform 108c through a game platform 108n. Some examples of the user devices 104a-104n and the game platforms 108a-108n may include, but are not limited to, laptops, smartphones, desktops, tablets, workstation terminals, an Ultra-Mobile personal computer (UMPC), a phablet computer, a handheld personal computer, and the like. Further, the environment 100 is depicted to include a server system 114, a game application server 116, a database 118 and adult toys (such as, an adult toy 106a, an adult toy 106b, an adult toy 106c . . . an adult toy 106n) associated with each user of the users 102. Examples of the adult toys may include, but are not limited to, a dildo, a vibrator, or any adult entertainment apparatus or all genders. The adult toys 106a-106n may be connected wirelessly with the user devices 104a-104n. Some examples of the wireless connectivity for enabling connection between the adult toys and the user devices may be, but not limited to, near field communication (NFC), wireless fidelity (Wi-Fi), Bluetooth and the like.

Various entities in the environment 100 may connect to a network 120 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 120 may include a secure protocol (e.g., Hypertext Transfer Protocol (HTTP)), and/or any other protocol, or set of protocols. In an example embodiment, the network 120 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

In an embodiment, the user devices 104a-104n and the game platforms 108a-108n are equipped with an instance of an adult toy management application 110 (hereinafter interchangeably referred to as 'application 110') and a gaming application 112, respectively. The gaming application 112 may be hosted and managed by the game application server 116. The application 110 is hosted and managed by the server system 114, for operating the adult toy (e.g., the adult toy 106a) associated with a user (e.g., the user 102a). In an embodiment, the server system 114 may provide the application 110, in response to a request received from the user devices 104a-104n via the network 120. In another embodiment, the application 110 may be factory-installed on the user devices 104a-104n. In another embodiment, the user device such as, the user device 104a may access an instance of the application 110 from the server system 114 for installing on the user device 104a using application stores associated with operating systems such as Apple IOS®, Android™ OS, Google Chrome OS, Symbian OS®, Windows Mobile® OS, and the like.

The server system 114 is embodied in at least one computing device in communication with the network 120. The server system 114 may be specifically configured, via executable instructions to perform one or more of the operations described herein. In general, the server system 114 is configured to determine a control pattern based on one or more action inputs associated with the gaming application 112. The gaming application 112 is a third-party application, which has made a contractual agreement with the application 110 to comply with privacy and security requirements of the application 110. Based on the contractual agreement, the server system 114 may provide application programming interfaces (APIs) to the game application server 116. The game application server 116 may monitor the action inputs in the gaming application 112 and indicate the server system 114 for providing necessary instructions (or the control pattern) to the application 110 for operating the adult toys. In an embodiment, the gaming application 112 may be hosted and managed by the server system 114.

In the illustrative embodiment, the server system 114 is configured to enable an interaction mode between a game platform (e.g., the game platform 108a) and a user device (e.g., the user device 104a) associated with the user 102a, for operating the adult toy 106a. The present disclosure is herein described with reference to the user 102a, and it should be noted that the same teaching and spirit taught by the present disclosure can be applied when the context is for other users. Further, the interaction mode is established between the game platform 108a (e.g., computer) and the user device 104a (e.g., mobile phone) using a two-dimensional (2D) code provided by the server system 114 at a user interface of the gaming application 112. The user 102a may be required to scan/enter the code for establishing the interaction mode.

Upon establishing the interaction mode, the user 102a may play a game provided by the gaming application 112 using the game platform 108a. The user 102a may use at least one input/output device for playing the game in the game platform 108a. Examples of the input/output device may be a keyboard, a mouse, a joystick, and the like. The server system 114 receives the action inputs associated with a character of the gaming application 112 from the game application server 116. Without limiting the scope of the present disclosure, the character in the gaming application 112 is a virtual avatar or a representation for the user 102a in the gaming application 112. Further, the action inputs are performed by the character in the gaming application 112 based at least on the user inputs in the gaming application 112. The action inputs associated with the character correspond to the game related actions associated with the gaming application 112. For instance, the gaming application 112 may be a beach volleyball game and the action inputs that are performed by the character (i.e. the game related actions) in the beach volleyball game may be to serve a ball, catch the ball, smash the ball, and the like.

The server system 114 transmits the control pattern to the application 110 installed in the user device 104a based on receiving the game related action performed by the character in the gaming application 112. The user 102a may provide an input in the application 110 for operating the adult toy 106a in the control patterns' way in order to deliver physical stimulus (or sexual pleasure) to the user 102a.

In one scenario, the server system 114 may receive the action inputs performed by two or more users (such as the user 102a and the user 102b) of a multi-player game. In this scenario, the control pattern is provided to the users 102a, 102b of the multi-player game based on the game related actions performed by the character associated with any one user (either the user 102a or the user 102b) of the multi-player game.

Further, the server system 114 integrated to the game application server 116 may facilitate broadcasting/live streaming of the live game being played by the user 102a to other users (e.g., the users 102b-102n) of the application 110. In this case, the control pattern is provided to the users 102a-102n when the game related action is performed by the character controlled by the user 102a in the live game. This enables the users 102b-102n associated with their respective adult toys 106b-106n to operate (i.e. vibrate) in same way as that of the adult toy 106a associated with the user 102a.

In an embodiment, the server system 114 may include one or more databases, such as a database 118. In an embodiment, the database 118 may be a separate entity (or an external database) that is in communication with the server system 114 via the network 120. The database 118 may be configured to store the game related actions, the control patterns, unique identifier associated with the adult toys, and the like.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG.

1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
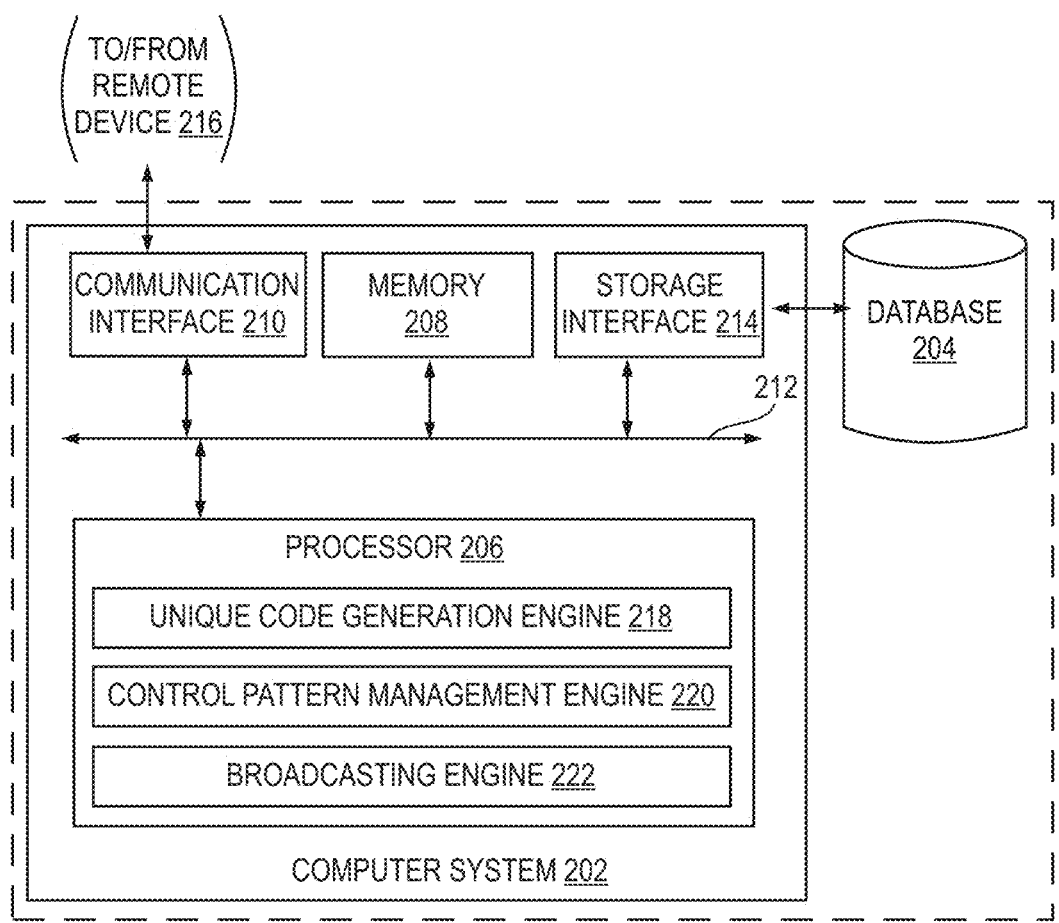
FIG. 2 illustrates a simplified block diagram of a server system used for controlling adult toys based on game related actions performed in a gaming application, in accordance with one embodiment of the present disclosure.

FIG. 2 illustrates a simplified block diagram of a server system 200 used for controlling adult toys based on the game related actions performed in the gaming application, in accordance with one embodiment of the present disclosure. Examples of the server system 200 include, but are not limited to, the server system 114 as shown in FIG. 1.

The server system 200 includes a computer system 202 and a database 204. The computer system 202 includes at least one processor 206 for executing instructions, a memory 208, a communication interface 210 and a storage interface 214. The one or more components of the computer system 202 communicate with each other via a bus 212. The components of the server system 200 provided herein may not be exhaustive and the server system 200 may include more or fewer components than those depicted in FIG. 2. Further, two or more components may be embodied in one single component, and/or one component may be configured using multiple sub-components to achieve the desired functionalities.

In one embodiment, the database 204 is integrated within the computer system 202 and configured to store an instance of the adult toy management application 110 and one or more components of the adult toy management application 110. The one or more components of the adult toy management application 110 may be, but not limited to, information related to user inputs, parameters associated with the control pattern, user profiles associated with the users 102, the game related actions, and the like. The computer system 202 may include one or more hard disk drives as the database 204. The storage interface 214 is any component capable of providing an access to the database 204, to the processor 206. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer readable instructions for performing security investigation and response analysis. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In some embodiments, the memory 208 may be realized in the form of a database server or a cloud storage working in conjunction with the server system 200, without deviating from the scope of the present disclosure. In some embodiments, the memory 208 may be realized in the form of a database server or a cloud storage working in conjunction with the server system 200, without deviating from the scope of the present disclosure.

The processor 206 is operatively coupled to the communication interface 210 such that the processor 206 is capable of communicating with a remote device 216 such as, the user devices 104a-104n, the game platforms 108a-108n, the adult toys 106a-106n, the game application server 116, the database 118, or with any entity connected to the network 120 as shown in FIG. 1.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a unique code generation engine 218, a control pattern management engine 220 and a broadcasting engine 222. As such, the one or more components of the processor 206 as described above are communicably coupled with the application 110 and configured to control the adult toys such as, the adult toys 106a-106n in order to deliver physical stimulus (e.g., vibrotactile output) to the users 102a-102n corresponding to the game related actions.

The unique code generation engine 218 includes a suitable logic and/or interface for creating and transmitting the unique code to the gaming application 112. The unique code may be the two-dimensional (2D) code. More specifically, the unique code generation engine 218 is configured to generate and transmit the unique code to the user (such, as the user 102a), upon login to the gaming application 112. The user 102a is required to provide login credentials (such as, username and password) used while creating an account in the gaming application 112 to login to the gaming application 112. The game application server 116 authorizes the credentials to authenticate the user 102a for allowing the user 102a to login to the gaming application 112. Further, the user 102a may provide an input in the gaming application 112 related to use of the adult toy for playing the game. Thereafter, the server system 114 generates and transmits the unique code to the gaming application 112. Examples of the two-dimensional (2D) code (or the unique code) include, but are not limited to, Quick response (QR) code, Data matrix, GS1 DataBar, and the like.

The user 102a may scan the unique code (e.g., the QR code) displayed in the gaming application 112. Upon scanning the QR code, the processor 206 of the server system 200 is configured to enable the interaction mode between the gaming application 112 and the adult toy management application 110. In an embodiment, the unique code generation engine 218 may provide an alphanumeric code, or any other code as per feasibility and requirements for establishing the interaction mode. Thereafter, the user 102a selects a game (e.g., beach volleyball) in the gaming application 112 for playing the game.

The control pattern management engine 220 includes a suitable logic and/or interface to generate, store and transmit the control pattern based on the game related actions performed by the character that is controlled by the user 102a in the gaming application 112. More specifically, the control pattern management engine 220 receives the game related actions associated with the gaming application 112 from the game application server 116. In one example scenario, the game related actions may be predefined in the gaming application 112. In another example scenario, the game related actions may be defined by the user 102a in the gaming application 112 for operating the adult toy 106a. The control pattern management engine 220 generates the control pattern for each of the game related action associated with the gaming application 112. The control pattern includes one or more parameters such as a total run time, intensity, an operating type of the adult toy, and a unique identifier associated with the adult toy, and the like. Further, the control pattern management engine 220 may receive the unique identifier from the application 110 when the adult toy 106a associated with the user 102a is connected to the application 110 (e.g., via Bluetooth). Additionally, the control pattern management engine 220 is configured to receive the control pattern generated by the user 102a in the adult toy management application 110. The user 102a generates the control pattern corresponding to each of the game related action by providing inputs related to the timing, intensity, operating type of the adult toy, and the like in the application 110 which is explained further in detail.

The control pattern generated for each of the game related action by the control pattern management engine 220 may be in form of an executable instruction. For example, the game played by the user 102a in the gaming application 112 may be the beach volleyball, the control pattern defined for the game related action (e.g., smash the ball) is represented in form of the executable instruction. An example of the control pattern including the parameters that are represented in the executable instruction format is as shown below:

```
{
    command: "Function",
    action: "Vibrate:16",
    timeSec: 20,
    toy: "ff922f7fd345",
    apiVer: 1
}
```

The 'command' corresponds to a type of request i.e. the game related action (e.g., smash the ball) that is represented by using a string data type (see, 502 of FIG. 5). The 'action' refers output intensity/strength associated with each of the operating type (such as vibrate, rotate or pump) associated with the adult toys (see, 504 of FIG. 5). The 'action' may be defined using the string data type (see, 504 of FIG. 5). Further, the 'timeSec' refers to the total run time associated with the adult toy, and can be represented using a double data type (see, 506 of FIG. 5). It should be noted that the total run time of the adult toy should be greater than 1 (i.e. 1 sec). The 'toy' refers to the unique identifier associated with the adult toy, and can be represented using the string data type (see, 508 of FIG. 5). The control pattern management engine 220 may determine/identify the adult toy (such as, the adult toy 106a) to be controlled based on the unique identifier. It is evident from the above executable instruction (or the control pattern) that the adult toy (e.g., the adult toy 106a) associated with the unique identifier 'ff922f7fd345' is operated for a total run time of 20 seconds at intensity of $16^{th}$ strength based on performing the game related action (e.g., smashing the ball) by the user 102a in the gaming application 112.

Further, the control pattern management engine 220 configures a loop setting in the total run time. For example, the loop setting may include, operate for 5 seconds and pause 1 second until the total run time. An example of the control pattern including the parameters related to loop setting represented in the executable instruction format is as shown below:

```
{
    command: "Function",
    action: "Vibrate:16",
    timeSec: 60,
    LoopRunningSec: 9,
    LoopPauseSec: 4,
    toy: "ff922f7fd345",
    apiVer: 1
}
```

Where, 'LoopRunningSec' and 'LoopPauseSec' define the loop setting.

It is evident from the above executable instruction that the adult toy (e.g., the adult toy 106a) associated with the unique identifier 'ff922f7fd345' is operated at intensity of $16^{th}$ strength for total run time of 60 seconds, where the adult toy operates for 9 seconds and then suspends for 4 seconds until the total run time.

In an embodiment, the control pattern management engine 220 may be configured to assign a pattern name in the executable instruction. The pattern name may be created by the control pattern management engine 220, while generating the control pattern for each of the game related action. In an embodiment, the control pattern management engine 220 may assign the pattern name associated with the control pattern that is generated by the user 102a. The pattern name can be represented by using the string data type in the executable instruction (see, 510 of FIG. 5).

As explained above, the server system 200 and the game application server 116 are integrated for controlling the adult toys through the application 110 based on the action inputs performed by the character in the gaming application 112. Thus, the processor 206 may be configured to receive the game related actions performed by the user 102a in the gaming application 112 through the game application server 116. Thereafter, the control pattern management engine 220 transmits the control pattern to the user device 104a defined for the game action to the user 102a.

In one scenario, server system 200 is configured to receive the action inputs performed by the characters controlled by the two or more users of the multi-player game as explained above in a collaborative environment. The two or more users of the multi-player game may be the user 102a and the user 102b. As such, the user 102a may provide the inputs in the gaming application 112 related to the opponent users (e.g., the user 102b) among the users 102 of the application 110 for playing the multi-player game. In this scenario, the game application server 116 may transmit a request to the user 102b. Further, the game application server 116 enables the user 102a to play with the user 102b (i.e. multi-player game) based at least on receiving a confirmation from the user 102b for the multi-player game. In such scenario, the server system 200 may receive the action inputs performed by the characters in the gaming application 112 during the multi-player game. Each character in the multi-player game is controlled by each of the two or more users of the multi-player game. To that effect, the control pattern management engine 220 is configured to retrieve the control pattern associated with the user who performed the game related action in the gaming application 112. Thereafter, the control pattern of the user who performed the game related action is transmitted by the control pattern management engine 220 to each of the users of the multi-player game. For example, the game related action may be performed by the character that is controlled by the user 102a. As such, the control pattern associated with the user 102a for the particular game related action is transmitted to both the users 102a and 102b. This enables the users (i.e. the users 102*a* and 102*b*) of the multi-player game to operate the adult toys in the control patterns' way.

In an embodiment, the control pattern management engine 220 may transmit the control pattern (i.e. a preset pattern) that is predefined for the particular game related action to the users of the multi-player game, irrespective of the user who performed the game related action. In one embodiment, providing the control pattern depends on a network connectivity (e.g., Internet/Local area network (LAN) connection) of the game platform 108*a* and the user device 104*a* which is explained with reference to FIG. 3.

The broadcasting engine 222 includes a suitable logic and/or interfaces for broadcasting/live streaming a live game being played by a user (such as the user 102*a*) in the gaming application 112 to other users (e.g., the users 102*b* and 102*c*) of the users 102. The game application server 116 may transmit the live game being played by the user 102*a* to the broadcasting engine 222 for broadcasting to the users 102*b* and 102*c*. The game application server 116 transmits the live game to the broadcasting engine 222 based on receiving a request from each of the users 102*b* and 102*c* through the gaming application 112. It should be noted that the live game is streamed on the game platforms 108*b* and 108*c* associated with the users 102*b* and 102*c*, respectively. In this scenario, the control pattern management engine 220 transmits the control pattern to the user 102*a*-102*c* based at least on receipt of the game related actions performed by the character that are controlled by the user 102*a* in the live game. In other words, when the character controlled by the user 102*a* performs the action input in the gaming application 112, the adult toy 106*a* of the user 102*a* operates to provide physical stimulus to the user 102*a*. Simultaneously, the adult toys 106*b* and 106*c* are operated in the control patterns' way of the user 102*a* during the live game in order to provide the physical pleasure to the users 102*b* and 102*c* .

Figure 3:
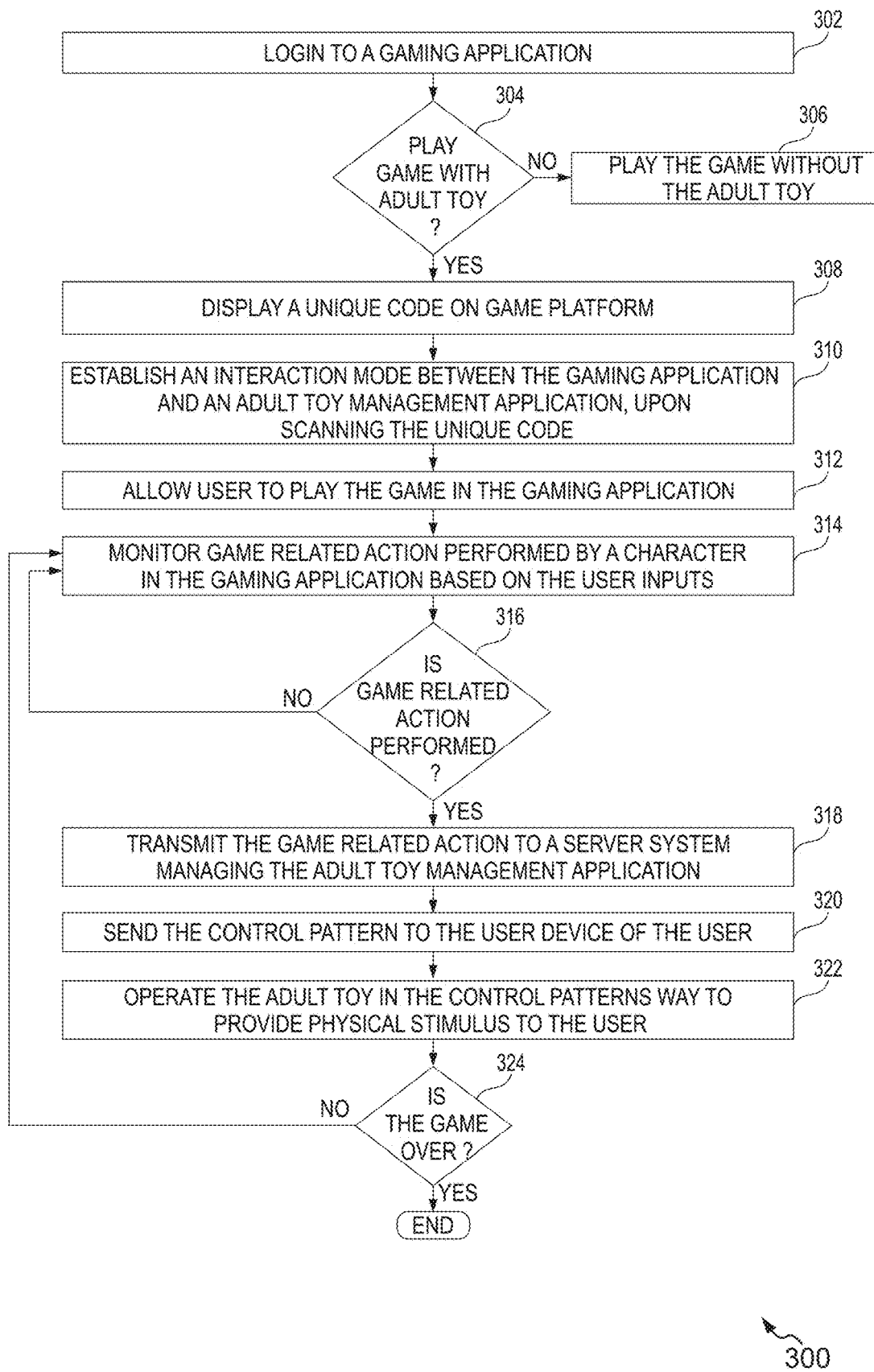
FIG. 3 represents a flow chart for a process flow for controlling the adult toys based on the game related actions, in accordance with an example embodiment of the present disclosure.

FIG. 3 represents a flow chart 300 for a process flow for controlling the adult toys based on the game related actions, in accordance with an example embodiment of the present disclosure. It should be appreciated that each operation explained in the flow chart 300 is performed by the server system 200. The steps of the flow chart 300 are performed when the game platform 108*a* and the user device 104*a* associated with the user 102*a* are connected to different network connectivity (i.e. different Internet/Local area network (LAN) connection). The sequence of operations of the flow chart 300 may not be necessarily executed in the same order as they are presented. Further, one or more operations may be grouped together and performed in form of a single step, or one operation may have several sub-steps that may be performed in parallel or in a sequential manner.

At 302, the user 102*a* logs in to the gaming application 112. The user 102*a* is required to provide the login credentials such as, the username and password for logging in to the gaming application 112 as explained above. The game application server 116 authorizes the credentials to authenticate the user 102*a*. Upon authentication, the user 102*a* can play the game in the gaming application 112 using the game platform 108*a*.

At 304, the game application server 116 checks whether the game is being played using the adult toy 106*a* by the user 102*a*. More specifically, the user 102*a* may be provided with an option in the gaming application 112 related to the selection of the adult toy 106*a* for playing the game upon login to the gaming application 112. In one scenario, if the user 102*a* wishes to play the game without using the adult toy 106*a*, at step 306, the user 102*a* is allowed to play the game in the gaming application 112 without using the adult toy 106*a*. It should be understood that the game related action performed by the character that is controlled by the user 102*a* does not operate the adult toy 106*a*, if the user 102*a* selects to play the game without the adult toy 106*a*. Further, if the user 102*a* opts the adult toy 106*a* for playing the game in the gaming application 112, step 308 is performed.

At step 308, the server system 200 displays a unique code in the gaming application 112. The server system 200 generates the unique code (e.g., QR code) when the user 102*a* logs in to the gaming application 112 and opts the adult toy 106*a* to play the game. The user 102*a* is allowed to scan the QR code displayed in the gaming application 112 for establishing the interaction mode.

At step 310, the server system 200 establishes the interaction mode between the gaming application 112 and the adult toy management application 110, upon scanning the unique code. More specifically, the user 102*a* may launch the application 110 in the user device 104*a* for scanning the 2D code displayed on the game platform 108*a*. Upon scanning, the interaction mode between the application 110 and the gaming application 112 is established when the user 102*a* scans the QR code on the game platform 108*a*. In other words, the application 110 and the gaming application 112 are integrated to control the adult toy 106*a* which is further explained in detail. Upon establishing the interaction mode, the user 102*a* is allowed to play the game in the gaming application 112 (see, 312). The user 102*a* may be provided with a list of games associated with the gaming application 112. For instance, the user 102*a* may select a game (e.g., beach volleyball) from the list of games for playing. Further, the user 102*a* can predefine the action inputs related to the game (e.g., beach volleyball) in the gaming application 112. In an embodiment, the action inputs may be predefined in the gaming application 112. The user 102*a* provides inputs in the gaming application 112 to control the character in the gaming application 112 to perform the game related actions. The game application server 116 monitors the game related actions associated with the character of the gaming application 112 based on the user inputs provided in the gaming application 112 (see, 314).

At 316, the game application server 116 checks whether a game related action is performed by the character that is controlled by the user 102*a*. In one case, if the game related action is not performed by the user 102*a*, step 314 is performed. Further, if the game related action associated with the character is performed in the gaming application 112, step 318 is performed. At 318, the game application server 116 transmits the game related action associated with the character to the server system 200.

At 320, the server system sends the control pattern corresponding to the game related action to the user 102*a*. More specifically, the server system 200 determines the control pattern (either preset control pattern or the control pattern generated by the user 102*a*) corresponding to the game related action by accessing the database 204. For example, if the game related action performed is to serve the ball, the server system 200 retrieves the control pattern associated with the serving of the ball. Thereafter, the server system 200 transmits the control pattern to the user device 104*a* of the user 102*a*.

In an embodiment, the game application server 116 (or the gaming application 112) may provide the control pattern to the user device 104*a* bypassing the server system 114, when the game platform 108*a* and the user device 104*a* are connected to the common network connectivity (e.g., Internet/LAN connection). In this scenario, the game application server 116 may determine the control pattern corresponding to the game related action performed by the character in the gaming application 112 through the APIs associated with the server system 200. Thereafter, the game application server 116 may directly transmit the control pattern to the user device 104*a*.

At 322, the adult toy management application 110 operates the adult toy 106*a* associated with the user 102*a* in the control patterns' way to provide the physical stimulus to the user 102*a*. The user 102*a* may provide an input in the application 110 for operating the adult toy 106*a* to experience the sexual pleasure/physical stimulus, upon positioning the adult toy 106*a* at the vicinity of a sexual organ or genitalia of the user 102*a*.

At 324, the server system 200 checks the status of the game. In one case, if the game is determined to be over/completed, the process ends. Further, if the game is determined to be in progress (or ongoing), step 314 is performed for monitoring the game related action and the steps 316 to 322 are repeated until the user 102*a* is playing the ongoing game (or until game over).

Figure 4:
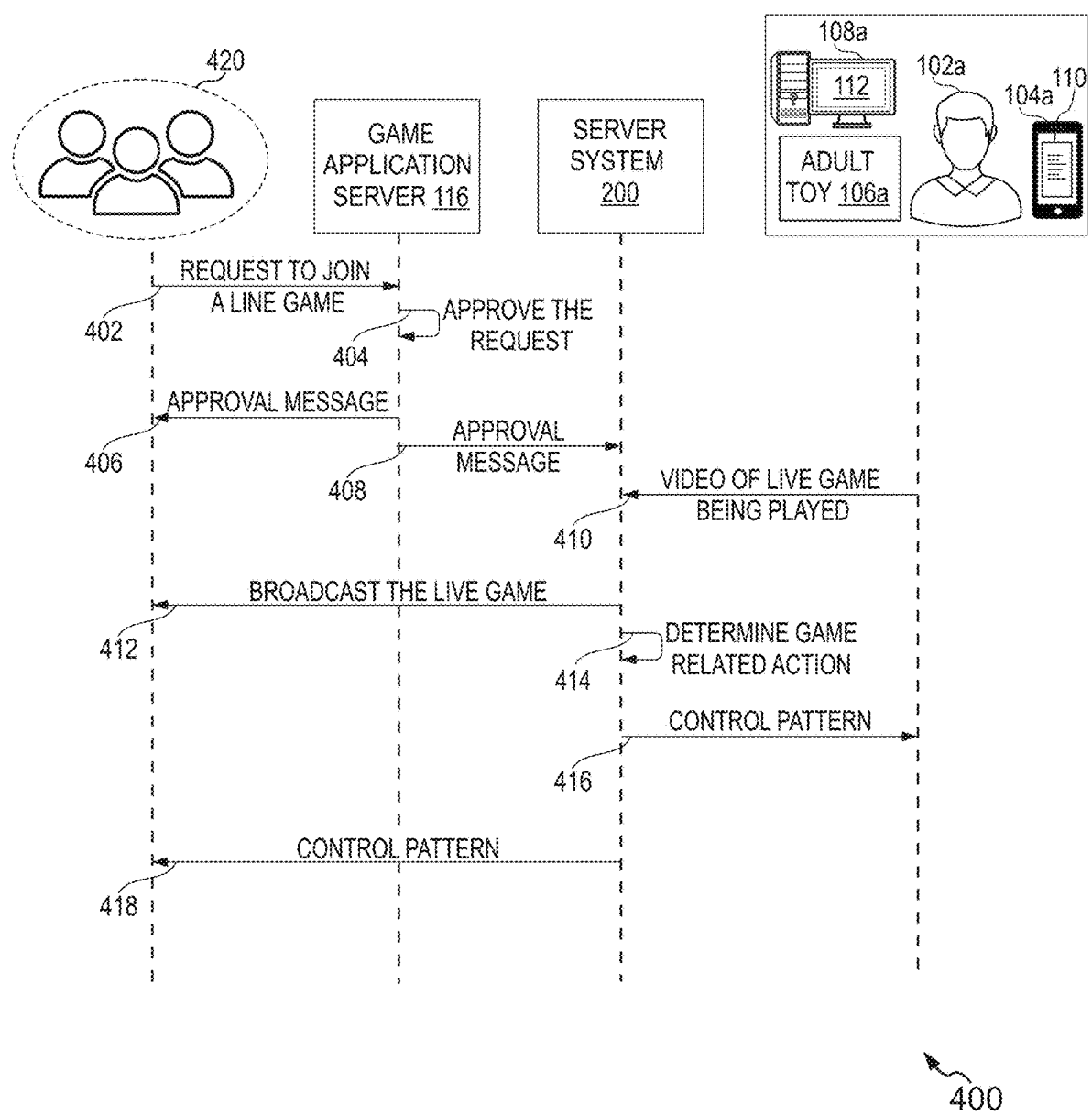
FIG. 4 illustrates a sequence flow diagram for online broadcasting of a live game associated with a user to other users of an adult toy management application, in accordance with an example embodiment of the present disclosure.

Referring to FIG. 4, a sequence flow diagram 400 for online broadcasting of a live game associated with a user, such as the user 102*a* to other users 420 of the application 110 is shown in accordance with an example embodiment of the present disclosure. It should be noted that the other users 420 may be the audience spectating the live game being played by the user 102*a*. For example, the other users 420 may be the users 102*b* and 102*c* among the users 102 of the application 110. Further, the steps of the sequence flow diagram 400 may not to be necessarily executed in the same order as they are presented. Further, one or more steps may be grouped together and performed in form of a single step, or one step may have several sub-steps that may be performed in parallel or in sequential manner.

At step 402, the other users 420 send a request for joining the live game playing by the user 102*a* to the game application server 116 through the gaming application 112. More specifically, the gaming application 112 may display a profile of each user among the users 102 who are playing the game at their game platform (e.g., the game platforms 108*b* and 108*c*). The users 420 may provide a selection input on the profile of the user 102*a* for spectating the live game. Upon providing the input, the request is transmitted to the game application server 116 through the gaming application 112. Thereafter, the game application server 116 approves the request for enabling online broadcasting (see, 404). At 406, the game application server 116 sends the approval message to the users 420. At 408, the game application server 116 sends an approval message to the server system 200.

At 410, the server system 200 receives the game playing (or the live game) in the gaming application 112 by the user 102*a*. At 412, the server system 200 broadcasts the live game being played by the user 102*a* to the users 420 in the gaming application 112 installed within the game platforms 108*b* and 108*c* of the users 420. Thus, the audience (or the users 420) can watch the video of the game being played by the user 102*a*. It should be noted that the users 420 with the adult toys 106*b* and 106*c* are synchronized with the adult toy 106*a* of the user 102*a* during the live game. Further, the video of the game playing by the user 102*a* in the gaming application 112 is transmitted to the server system 200 for broadcasting, until the game associated with the user 102*a* is over/completed.

At 414, the server system 200 determines the game related action performed by the character associated with the gaming application 112 based on the inputs provided by the user 102*a*.

At 416, the server system 200 provides the control pattern to the user 102*a* based at least on determining the game related actions performed in the live game associated with the user 102*a*. At 418, the server system 200 provides control pattern to the other users 420 based at least on determining the game related actions performed in the live game associated with the user 102*a*. It should be noted the control pattern associated with the user 102*a* is retrieved from the database 204 as explained above and transmitted to the users 102*a*-102*c* of the broadcast platform based at least on determining the game related actions performed by the user 102*a*. The control pattern enables the adult toy (i.e. the adult toys 106*b* and 106*c*) of each of the other users 420 to vibrate along with the adult toy 106*a* associated with the user 102*a* during the live game.

Further, the game application server 116 may store the game being played by the user 102*a* in a database associated with the game application server 116 for future retrieval. The users 420 may access the game played by the user 102*a* from the database by providing inputs in the gaming application 112. In this scenario, the users 420 may operate the adult toys 106*b* and 106*c* based at least on the game related actions performed in the pre-stored game associated with the user 102*a*. In an embodiment, the game may be stored in the server system 200. In another embodiment, the multi-player game may also be broadcasted to the audience for enabling the adult toys associated with the audience to operate in the same was as that of the users (or players) of the multi-player game.

Figure 6A:
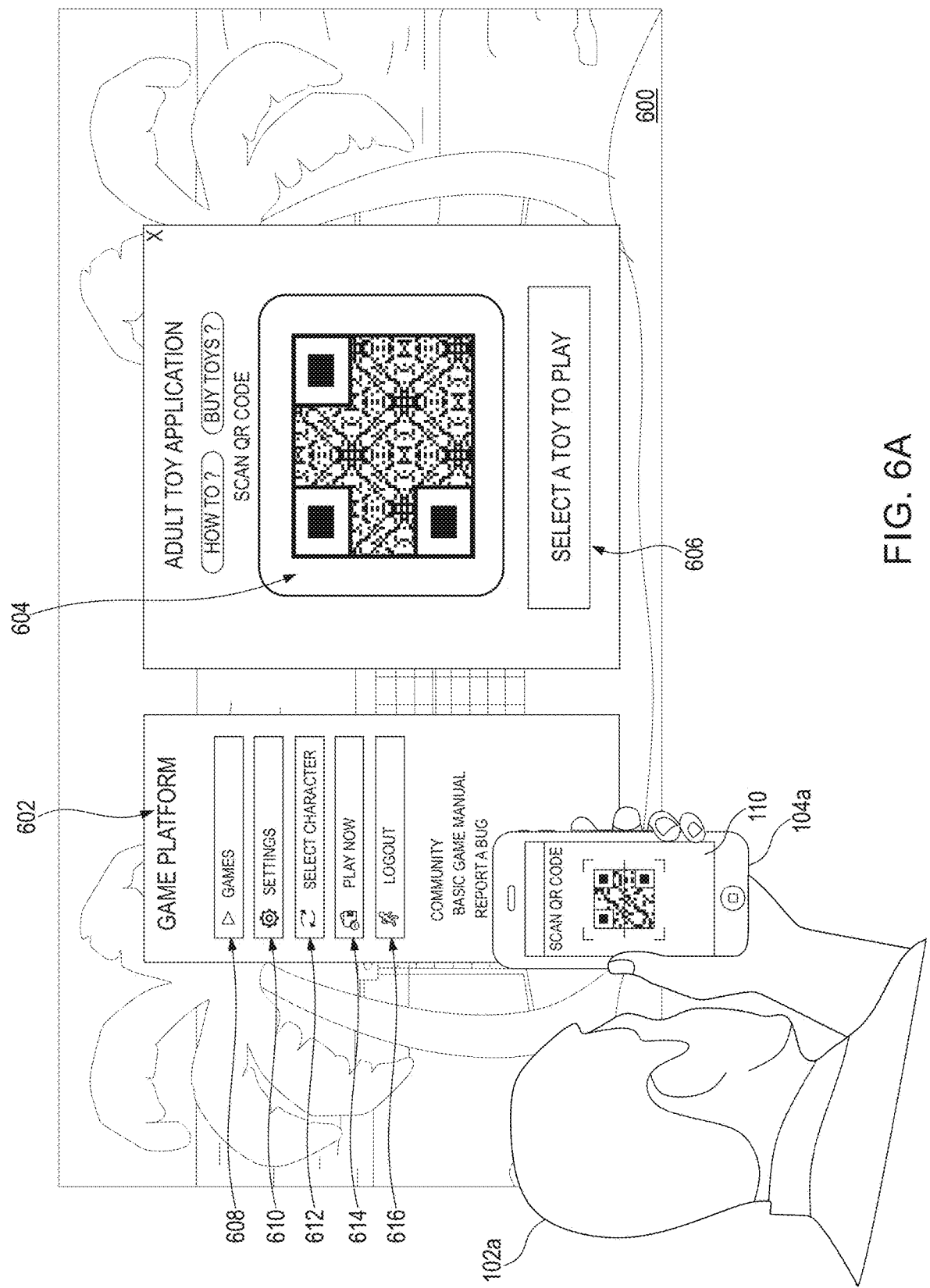
FIGS. 6A, 6B and 6C collectively, represent example representation of user interfaces (UIs) displayed to the user for playing a game in the gaming application by using the adult toys, in accordance with an embodiment of the present disclosure.
Figure 6B:
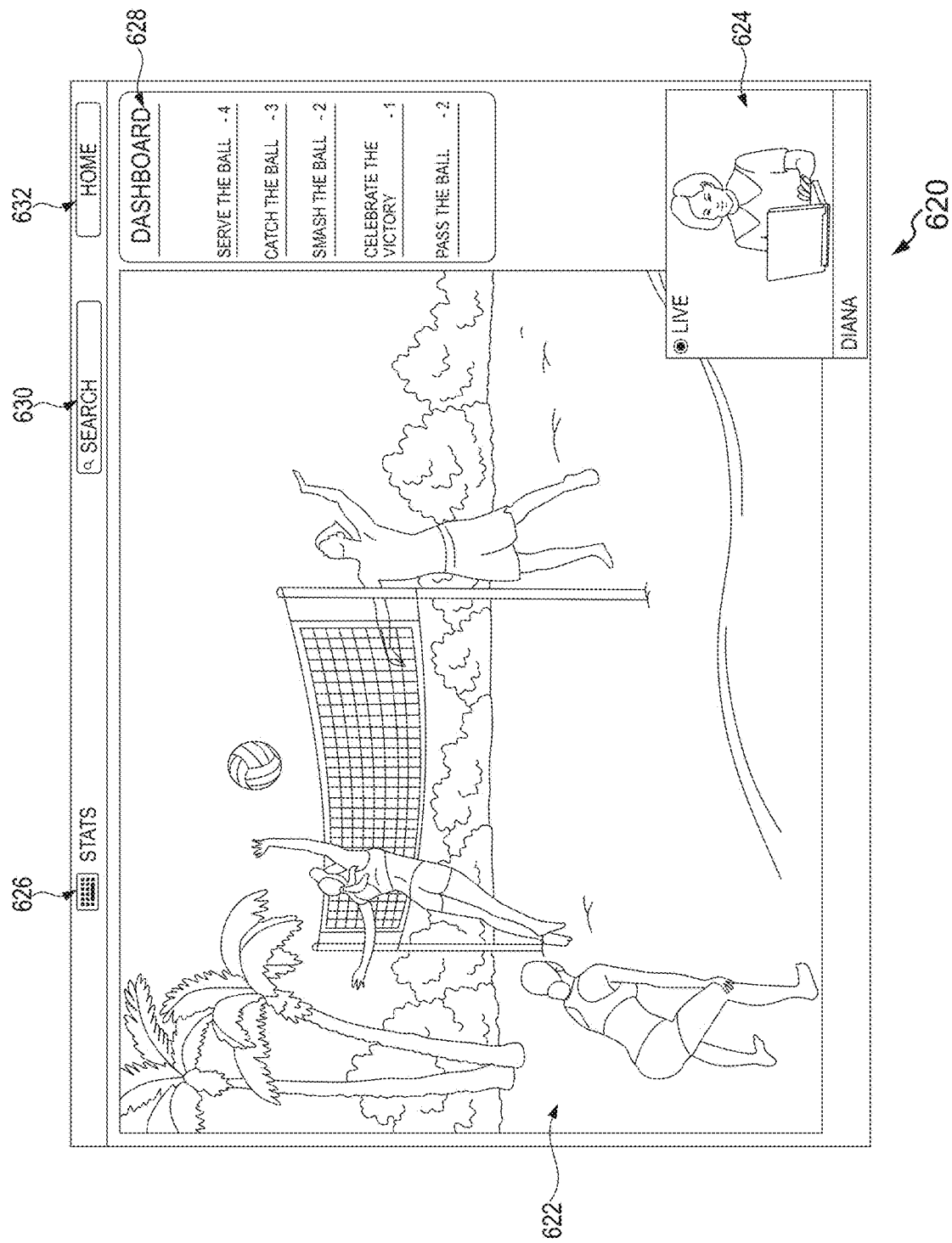
Figure 6C:
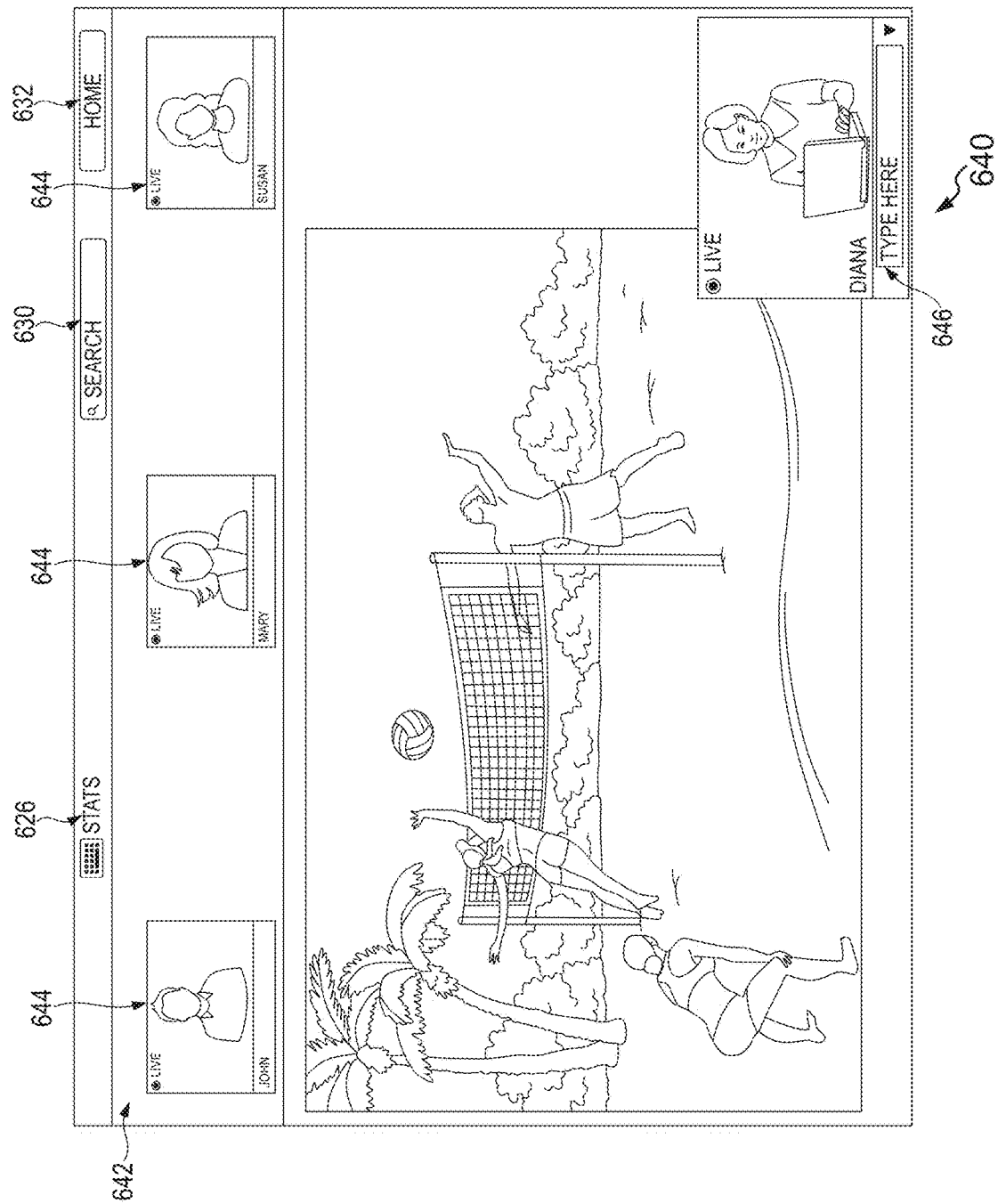

FIGS. 6A, 6B and 6C collectively, represent example representation of user interfaces (UIs) displayed to the user for playing the game in the gaming application 112 by using the adult toys, in accordance with an embodiment of the present disclosure.

Referring to FIG. 6A, a representation of a user interface (UI) 600 displayed to a user, such as the user 102*a* for allowing the user 102*a* to initialize the game in the gaming application 112 is shown in accordance with an embodiment of the present disclosure. The UI 600 renders a game platform 602 associated with the gaming application 112. The user 102*a* may select one or more buttons listed in the game platform 602 for initializing the game. Further, the UI 600 is depicted to include a 2D code/unique code 604 (exemplarily depicted to be 'QR code'). As explained above, the unique code 604 is depicted in the gaming application 112 for enabling the adult toy management application 110 to connect with the gaming application 112 (i.e. for establishing the interaction mode). Further, the unique code 604 is displayed by the sever system 200 on the UI 600 based on user selection of an option 606 associated with the text 'SELECT A TOY TO PLAY'. Upon providing input on the option 606, the user 102*a* may be provided with a UI depicting a list of toys for user selection (not shown in Figures). In an embodiment, the user 102*a* can play the game in the gaming application 112 without selecting the adult toy.

The user 102*a* scans the unique code 604 using the application 110 installed in the user device 104*a* for enabling the interaction mode between the application 110 and the gaming application 112. It should be understood that the adult toy 106*a,* the application 110 and the gaming application 112 are interconnected upon establishing the interaction mode (i.e. scanning the QR code). This enables the user 102a to play the game in the gaming application 112 using the adult toy 106a as explained above.

Upon establishing the interaction mode, the user 102a may provide an input (click or tap) on a button 608 for selecting a game for playing in the gaming application 112. The button 608 is associated with the text 'GAMES'. The user 102a may be rendered with a UI (not shown in Figures) depicting a list of games for users' selection. For instance, the user 102a may select the beach volleyball game from the list for playing. Further, the user 102a can define the game related actions by providing a user input on a button 610 associated with the text 'SETTINGS'. For instance, the user 102a can define the game related actions related to the beach volleyball game such as, serve the ball, catch the ball, smash the ball, pass the ball, and the like. Thereafter, the user 102a selects the character by providing an input on the button 612 associated with the text 'SELECT CHARACTER'. More specifically, the beach volley ball game may have several characters in a team, where the user 102a is required to select a character for playing the game. The character selected by the user 102a is the virtual avatar of the user in the game. As such, the user 102a controls the selected character to perform the game related actions by providing inputs in the gaming application 112 using the input/output devices of the game platform 108a. Further, the user 102a may customize dressing, physical appearance, etc., associated with the character (or the virtual avatar) based upon selection of the character. Upon selecting the character, the user 102a plays the game in the gaming application by providing input on the button 614 associated with the text 'PLAY NOW'. The user 102a is directed to a UI 620 depicting a playing arena upon providing input on the button 614.

Further, the UI 600 is depicted to include a button 616 associated with the text 'LOGOUT'. The user 102a is directed to a UI (not shown in Figures) for receiving the user credentials to login to the gaming application 112, upon clicking the button 616.

Referring to FIG. 6B, a representation of a user interface (UI) 620 displayed to the user 102a after initializing the game in the gaming application 112 is shown in accordance with an embodiment of the present disclosure. The UI 620 is depicted to include a playing arena 622 of the game upon initializing the game by proving inputs in the UI 600. The playing arena 622 is exemplarily depicted to be a volleyball court. The playing arena 622 includes a plurality of characters in each side of the volleyball court. It should be understood that the character selected by the user 102a is among the plurality of characters in the playing arena 622.

Further, the UI 620 is depicted to include a user profile 624 of the user 102a in the UI 620. It should be noted that the user profile 624 depicts a username (exemplary depicted to be 'DIANA') and a video of the user 102a while playing the game using the game platform 108a. In an embodiment, the user profile 624 may include an image of the character selected by the user 102a. The user profile 624 also depicts a live/active status associated with the user 102a (as shown in FIG. 6B). As such, the other users may join the live game based on viewing the live status of the user 102a which is explained further in detail.

The UI 620 is depicted to include a button 626 associated with the text 'STATS'. Upon providing input on the button 626, the user 102a is depicted with a dashboard 628 in the UI 620. As shown in FIG. 6B, the dashboard 628 includes the game related actions such as, 'serve the ball', 'catch the ball', 'smash the ball', 'celebrate the victory', and 'pass the ball' and frequency of each action occurred in the game (exemplarily depicted as '2' for smash the ball). The aforementioned game related actions are associated with the characters that are defined by the user 102a by providing inputs in the UI 600. Further, the user 102a is allowed to search for the users (or players) in the gaming application 112 by providing inputs in a search field 630. In an example scenario, the user 102a may search for the players for playing the multi-player game by providing inputs in the search field 630. The UI 620 is further depicted to include a button 632 associated with the text 'HOME'. The user 102a is directed to the UI 600 based on providing the input on the button 632.

Referring to FIG. 6C, a representation of a user interface (UI) 640 depicting a broadcasting of the live game in the gaming application 112 is shown in accordance with an embodiment of the present disclosure. The UI 640 is depicted to include an audience section 642. The audience section 642 is depicted to include users 644 (or audiences) who are spectating/watching the live game being played by the user 102a. The users 644 may be the users among the users 102 who wish to spectate the live game of the user 102a. The users 644 may join the live game of the user 102a by providing inputs in the search field 630 depicted in the game platform associated with the users 644. The audience section 642 is depicted to include a profile photo and a user name (exemplarily depicted to be 'JOHN', 'MARY', and 'SUSAN') for each of the users 644. In an embodiment, the video of the audience may be depicted in the UI 640 during the live game played by the user 102a. Thus, based on performing the gaming related action, the adult toy associated with the users 644 operates along with the adult toy 106a of the user 102a as explained above. Further, the user 102a may interact with users 644 by providing inputs in a text field 646 while playing the ongoing game.

Figure 7A:
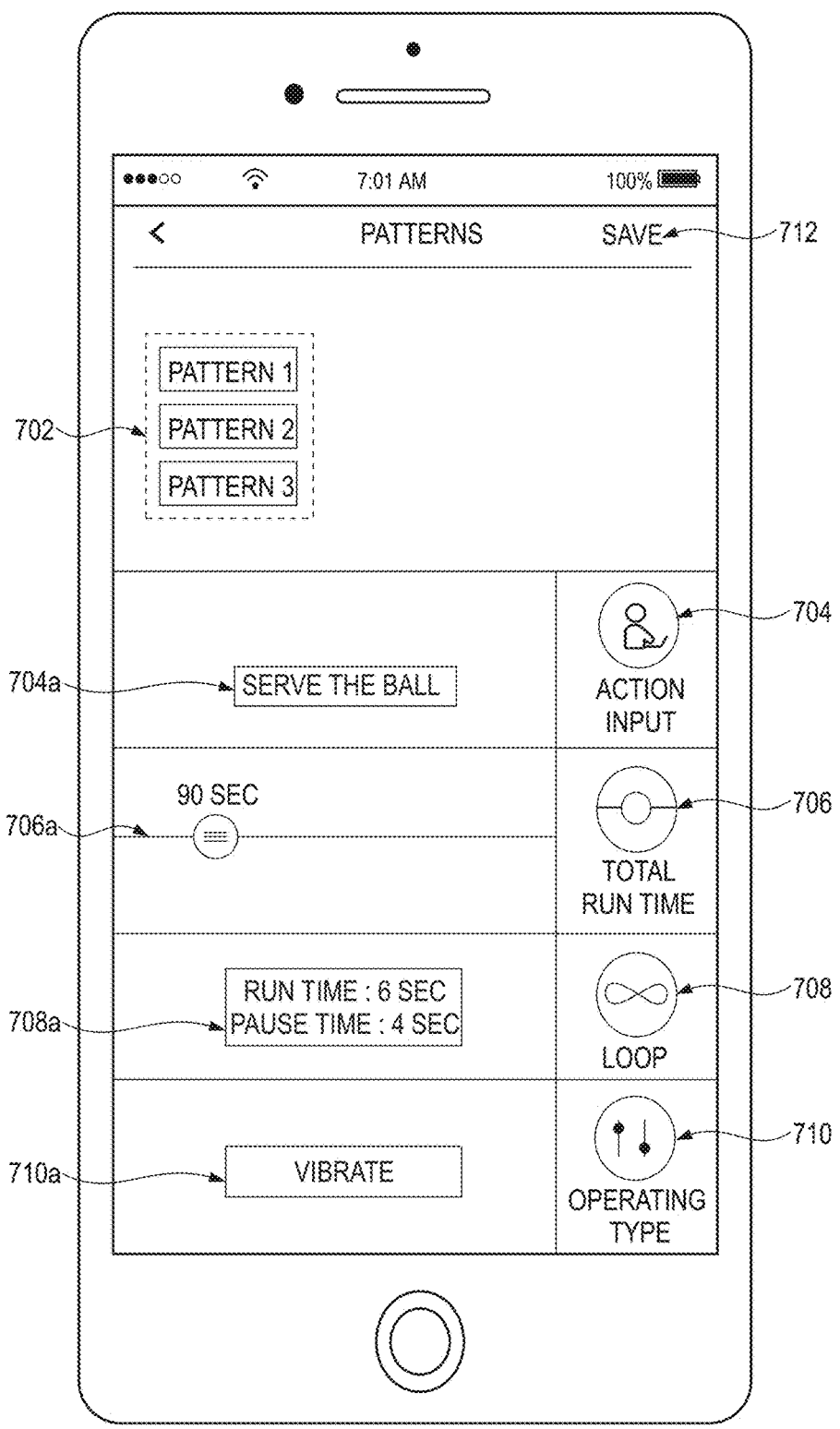
FIGS. 7A, 7B and 7C collectively, represent example representation of user interfaces (UIs) displayed to the user in the adult toy management application for controlling the adult toys, in accordance with an embodiment of the present disclosure.
Figure 7B:
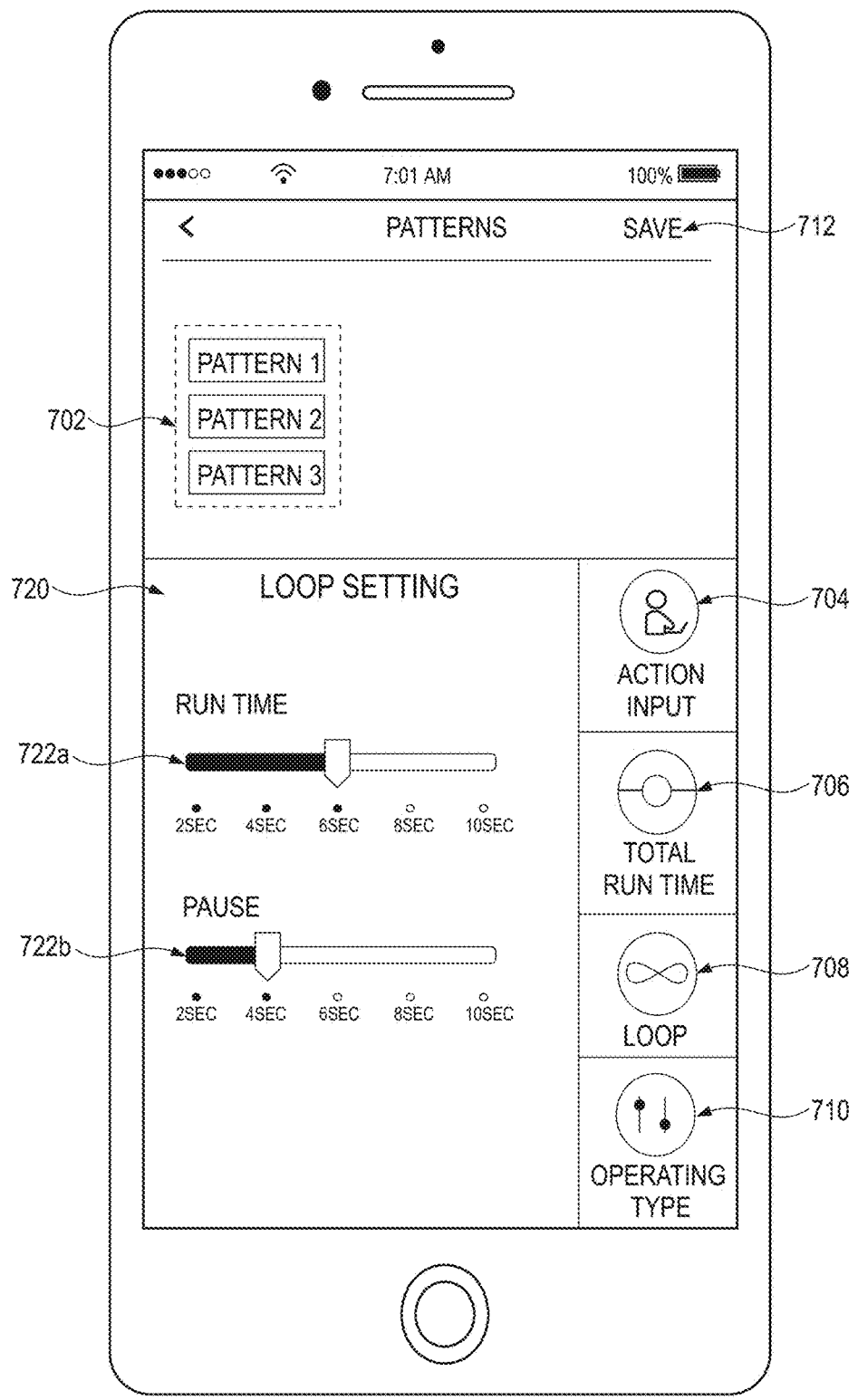
Figure 7C:
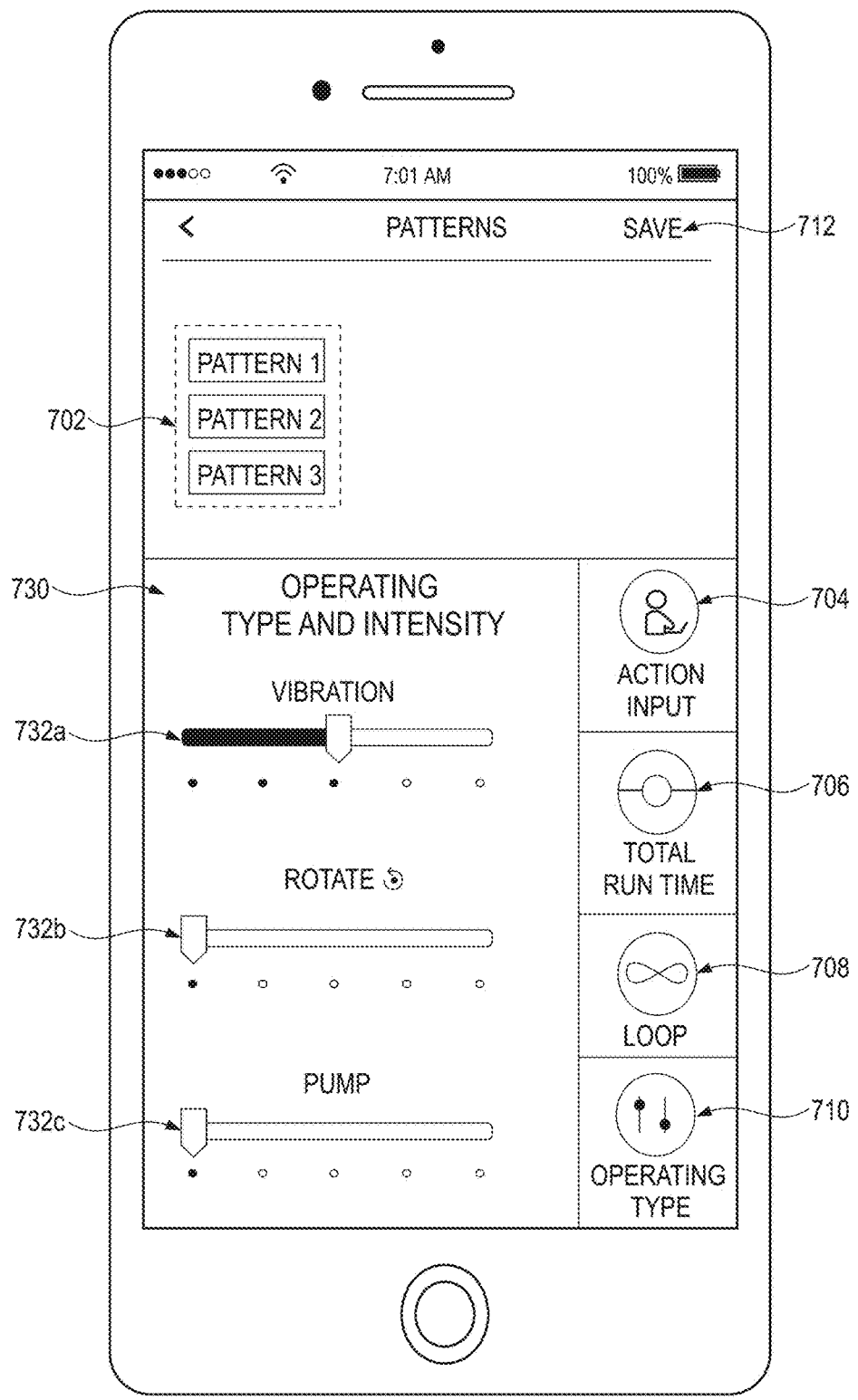

FIGS. 7A, 7B and 7C collectively, represent example representation of user interfaces (UIs) displayed to the user in the adult toy management application 110 for controlling the adult toys, in accordance with an embodiment of the present disclosure.

Referring to FIG. 7A, a representation of a user interface (UI) 700 depicted in the application 110 for generating the control pattern is shown in accordance with an embodiment of the present disclosure. The user 102a may use the adult toy 106a to generate the control pattern for each of the game related action defined in the gaming application 112. The UI 700 is depicted to include a list of patterns 702 (exemplarily depicted to be 'PATTERN 1', 'PATTERN 2', and 'PATTERN 3'). Each pattern from the list of patterns 702 is generated by using pattern settings such as an action input setting 704, a total run-time setting 706, a loop setting 708 and an operating type setting 710.

In an example scenario, the user 102a may generate a pattern for an action input such as serving the ball by using the pattern settings depicted in the UI 700. The user 102a selects the setting 704 for providing input related to the game related action for generating the pattern. Upon providing the click input on the setting 704, the UI 700 may be overlaid with a list of action inputs (not shown in Figures) defined for the character in the gaming application 112. It should be understood that the game related actions are transmitted by the game application server 116 through the server system 200 to the user device 104a upon establishing the interaction mode. Upon user selection, the game related action (exemplarily depicted to be 'serve the ball') is automatically entered in an information field 704a associated with the setting 704.

Thereafter, the user 102a sets the operating time (i.e. the total run-time) by providing input in the total run-time setting 706. The setting 706 is associated with a slide bar 706a for enabling the user 102a to slide over the bar 706a for setting the total run-time (exemplarily depicted to be '90 sec'). The user 102a can also provide the setting related to loop by using the loop setting 708. Upon providing input on the loop setting 708, the user 102a is provided with a tab 720 in the UI 700 for adjusting the loop setting for the game related action (as shown in FIG. 7B). The tab 720 is depicted to include a slide bar 722a and a slide bar 722b. The user 102a can slide over the slide bar 722a for adjusting the run time (exemplarily depicted to be '6 sec'). Further the user 102a adjusts the pause time by sliding over the slide bar 722b (exemplarily depicted to be '4 sec'). Upon adjusting, the user 102a provides click input on the loop setting 708, which enables the run time and pause time of the loop setting (exemplarily depicted to be 'run time: 6 sec' and 'pause time: 4 sec') to be automatically entered in an information field 708a. It should be understood that the adult toy operates (e.g., vibrates) intermittently for 6 seconds and pauses for 4 seconds until the total run-time of 90 seconds.

Further, the user 102a can provide the input related to operating type of the adult toy by using the operating type setting 710. Upon providing input on the setting 710, the user 102a is provided with a tab 730 in the UI 700 for providing the operating type setting associated with the adult toy (as shown in FIG. 7C). The tab 730 is depicted to include a slide bar 732a, a slide bar 732b, and a slide bar 732c associated with the operating type to vibrate, rotate, and pump, respectively. In one scenario, if the adult toy is operated to vibrate, the user 102a can slide over the slide bar 732a for selecting the operating type and adjust the intensity of vibration for the adult toy (as shown in FIG. 7C). In this scenario, the slide bar 732b and the slide bar 732c are maintained at '0' level or at lowest point of the slide bar (as shown in FIG. 7C). In another scenario, if the adult toy is associated with functionality to vibrate and rotate, the user 102a can select the operating type by sliding over the slide bars 732a and 732b. Upon adjusting, the user 102a provides input on the operating type setting 710 which enables the settings associated with the operating type (exemplarily depicted to be 'vibrate') to be automatically entered in an information field 710a. Further, the user 102a provides input on a button 712 to save the each of the settings and to generate the control pattern. The generated control pattern is transmitted to the server system 200 through the application 110 as explained above.

Figure 8:
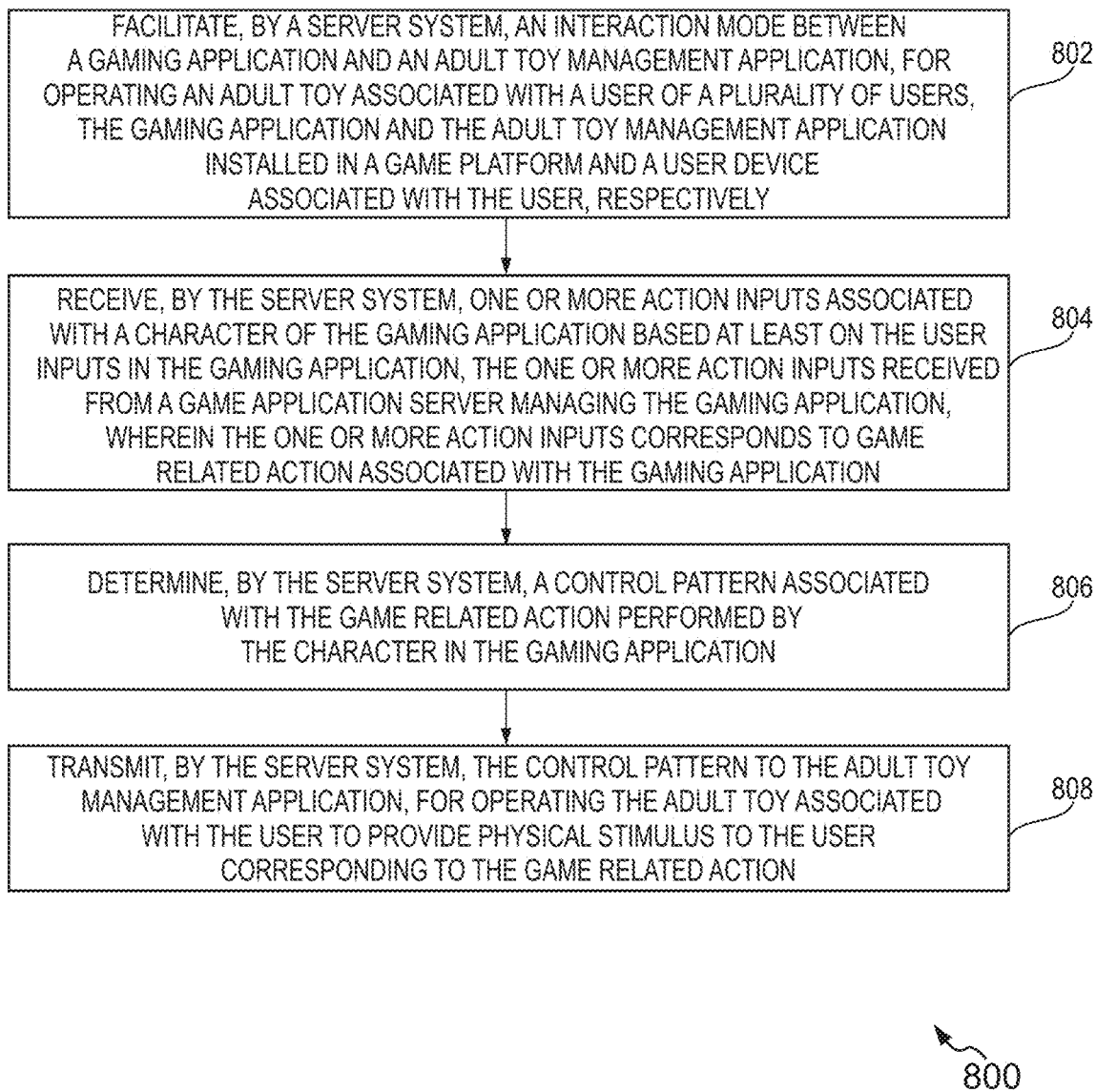
FIG. 8 illustrates a flow diagram of a computer-implemented method for controlling the adult toys based on the game related actions, in accordance with an embodiment of the present disclosure.

FIG. 8 illustrates a flow diagram of a computer-implemented method 800 for controlling the adult toys based on the game related actions, in accordance with an embodiment of the present disclosure. The method 800 depicted in the flow diagram may be executed by, for example, the server system 114 or the server system 200. Operations of the flow diagram of method 800, and combinations of operation in the flow diagram of method 800, may be implemented by, for example, hardware, firmware, a processor, circuitry, and/or a different device associated with the execution of software that includes one or more computer program instructions. It is noted that the operations of the method 800 can be described and/or practiced by using a system other than these server systems. The method 800 starts at operation 802.

At operation 802, the method 800 includes facilitating, by a server system, an interaction mode between a gaming application and an adult toy management application, for operating an adult toy associated with a user of a plurality of users. The gaming application and the adult toy management application are installed in a game platform and a user device associated with the user, respectively.

At operation 804, the method 800 includes receiving, by the server system, one or more action inputs associated with a character of the gaming application based at least on the user inputs in the gaming application. The one or more action inputs are received from a game application server managing the gaming application. Further, the one or more action inputs correspond to game related actions associated with the gaming application.

At operation 806, the method 800 includes determining, by the server system, a control pattern associated with the game related action performed by the character in the gaming application.

At operation 808, the method 800 includes transmitting, by the server system, the control pattern to the adult toy management application, for operating the adult toy associated with the user to provide physical stimulus to the user corresponding to the game related action.

Figure 9:
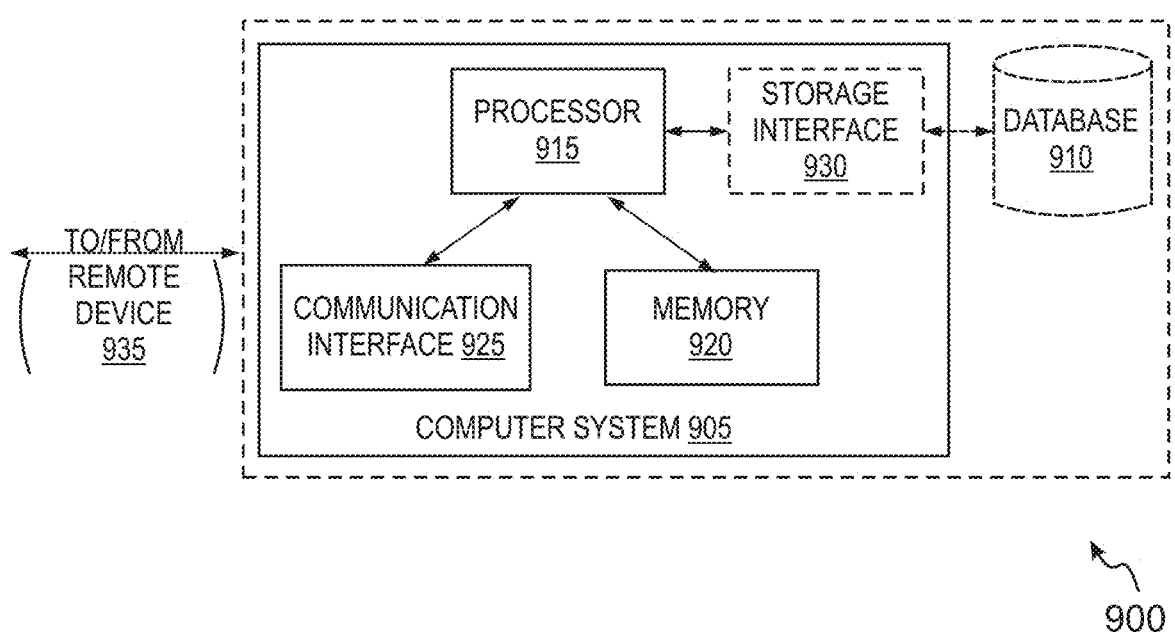
FIG. 9 is a simplified block diagram of a game application server, in accordance with one embodiment of the present disclosure.

FIG. 9 is a simplified block diagram of a game application server 900, in accordance with one embodiment of the present disclosure. The game application server 900 is an example of the game application server 116 of FIG. 1. The game application server 900 may be a separate part, and may operate apart via the network 120 (as shown in FIG. 1). The game application server 900 is configured to host and manage the gaming application 112. The game application server 900 includes a computer system 905 and a database 910.

The computer system 905 includes at least one processor 915 for executing instructions. Instructions may be stored in, for example, but not limited to, a memory 920. The processor 915 may include one or more processing units (e.g., in a multi-core configuration). The processor 915 is operatively coupled to a communication interface 925 such that the computer system 905 is capable of communicating with a remote device 935 such as the gaming application 112. For example, the communication interface 925 may receive at least a game related action, broadcast request message, and the like.

The processor 915 may also be operatively coupled to the database 910. The database 910 is any computer-operated hardware suitable for storing and/or retrieving data, such as, but not limited to, a list of user profiles of the players (i.e. the users 102a-102n), a list of games, game related actions, and the like.

In some embodiment, the database 910 is integrated within the computer system 905. For example, the database 910 may include multiple storage units such as hard disks and/or solid-state disks in a redundant array of inexpensive disks (RAID) configuration. The database 910 may include a storage area network (SAN) and/or a network attached storage (NAS) system. In some embodiments, the database 910 is integrated within the computer system 905. For example, the computer system 905 may include one or more hard disk drives as the database 910. In other embodiments, the database 910 is external to the computer system 905 and may be accessed by the computer system 905 using a storage interface 930. The storage interface 930 is any component capable of providing the processor 915 with access to the database 910. The storage interface 930 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 915 with access to the database 910.

The processor 915 of the computer system 905 is configured to monitor the gaming application 112 and transmit the game related actions performed by the character in the gaming application 112 to the server system 200. The server 900 is configured to authorize the broadcasting request for allowing the server system 200 to broadcast the live game being played by the user to the audience. Further, the functionalities associated with the game application server 900 are explained above, and therefore they are not reiterated herein, for the sake of brevity.

Figure 10:
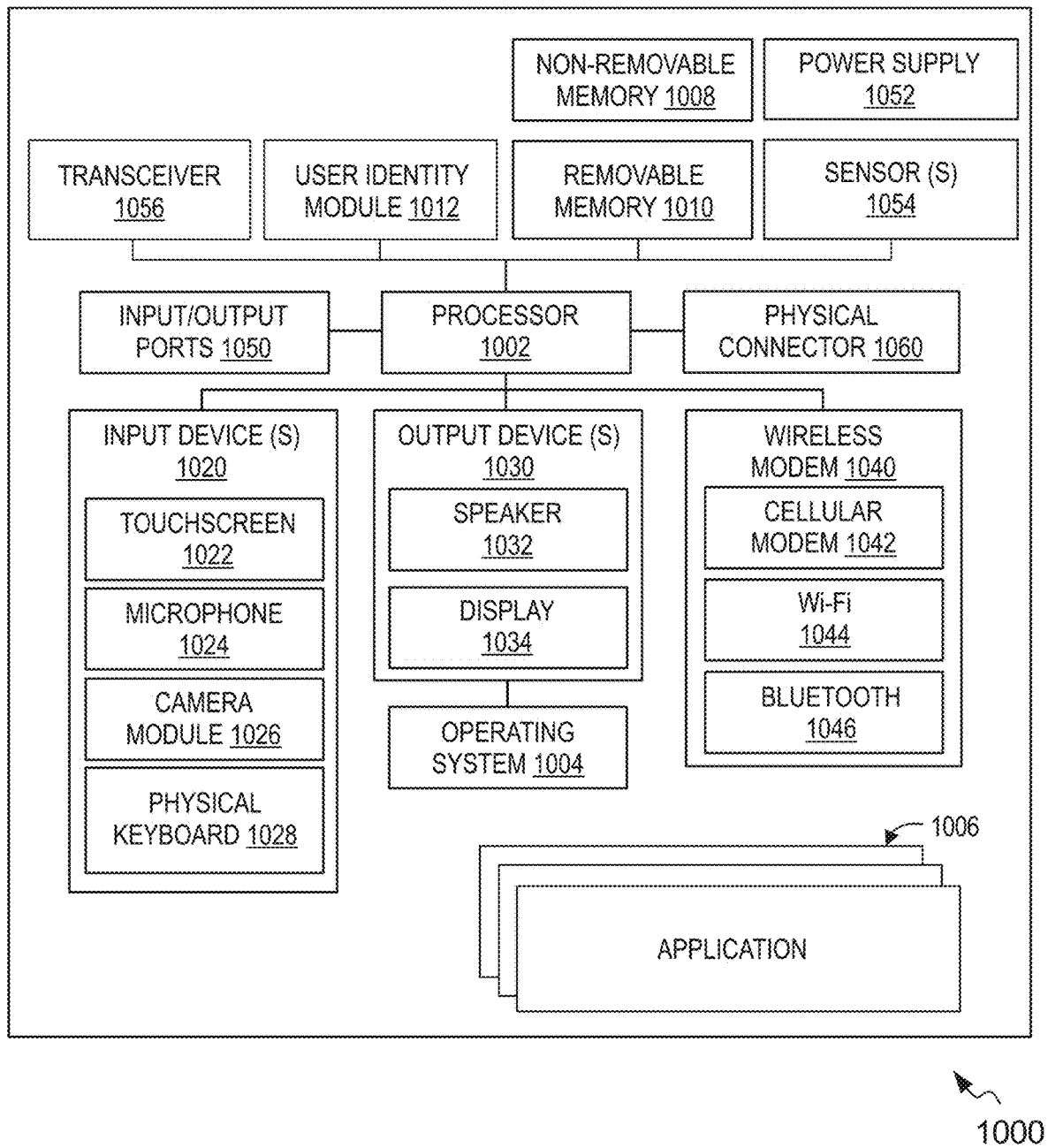
FIG. 10 is a simplified block diagram of an electronic device capable of implementing various embodiments of the present disclosure.

FIG. 10 is a simplified block diagram of an electronic device 1000 capable of implementing various embodiments of the present disclosure. For example, the electronic device 1000 may correspond to the user device 104a-104n of FIG. 1. The electronic device 1000 is depicted to include one or more applications 1006. For example, the one or more applications 1006 may include the application 110 of FIG. 1. The application 110 can be an instance of an adult toy management application downloaded from the server system 114. In an embodiment, the electronic device 1000 may be an example of the game platforms 108a-108n, and the applications 1006 may be the gaming application 112 of FIG. 1. One of the one or more applications 1006 installed on the electronic device 1000 are capable of communicating with a server system for controlling the adult toys of the users to provide physical stimulus to the users.

It should be understood that the electronic device 1000 as illustrated and hereinafter described is merely illustrative of one type of device and should not be taken to limit the scope of the embodiments. As such, it should be appreciated that at least some of the components described below in connection with the electronic device 1000 may be optional and thus in an embodiment may include more, less or different components than those described in connection with the embodiment of the FIG. 10. As such, among other examples, the electronic device 1000 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the electronic device 1000 and supports for one or more operations of the application (see, the applications 1006), such as the application 110 that implements one or more of the innovative features described herein. In addition, the applications 1006 may include common mobile computing applications (e.g., telephony applications, email applications, calendars, contact managers, web browsers, messaging applications) or any other computing application.

The illustrated electronic device 1000 includes one or more memory components, for example, a non-removable memory 1008 and/or removable memory 1010. The non-removable memory 1008 and/or the removable memory 1010 may be collectively known as a database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. The electronic device 1000 may further include a user identity module (UIM) 1012. The UIM 1012 may be a memory device having a processor built in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1000 can support one or more input devices 1020 and one or more output devices 1030. Examples of the input devices 1020 may include, but are not limited to, a touch screen/a display screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include, but are not limited to, a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the electronic device 1000 and a public switched telephone network (PSTN).

The electronic device 1000 can further include one or more input/output ports 1050, a power supply 1052, one or more sensors 1054 for example, an accelerometer, a gyroscope, a compass, or an infrared proximity sensor for detecting the orientation or motion of the electronic device 1000 and biometric sensors for scanning biometric identity of an authorized user, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added.

The disclosed method with reference to FIG. 9, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    facilitating, by a system, an interaction mode between an application and an adult toy, the adult toy being associated with a first user or a second user from among a plurality of users of the system, and the application being an application installed on a user device associated with the first user;
    receiving, by the system, at least one action input associated with a virtual object in the application, based at least on user input by the first user during execution of the application, each of the at least one action input corresponding to an interaction mode related action performed by the virtual object in the application;
    determining, by the system, a control pattern associated with the interaction mode related action performed by the virtual object in the application, the control pattern being a pattern for controlling operation of the adult toy associated with the first user or the second user, and the control pattern including plural actions sequentially executed over a total run time; and
    transmitting, by the system, the control pattern to the adult toy associated with the first user or the second user, thereby operating the adult toy associated with the first user or the second user to perform the plural actions so as to provide a physical stimulus to the first user or the second user corresponding to the interaction mode related action,
    wherein the plural actions of the adult toy associated with the first user or the second user are configured to follow the interaction mode related action performed by the virtual object in the application, and
    wherein the control pattern controls one or more parameters related to the total run time, the one or more parameters comprising a loop setting, an intensity, an operating type of the adult toy associated with the first user or the second user, and a unique identifier associated with the adult toy associated with the first user or the second user.

2. The computer-implemented method as claimed in claim 1, wherein the application comprises an adult toy management application for operating the adult toy associated with the first user or the second user and a game application for providing the interaction mode.

3. The computer-implemented method as claimed in claim 2, wherein the adult toy management application and the game application are integrated into one application installed on the user device associated with the first user.

4. The computer-implemented method as claimed in claim 2, wherein the game application comprises a third-party application which provides application programming interfaces (APIs) to the adult toy management application.

5. The computer-implemented method as claimed in claim 1, further comprising:
displaying a virtual element representing the control pattern on a user interface of the user device associated with the first user
wherein the virtual element follows the interaction mode related action performed by the virtual object in the application.

6. The computer-implemented method as claimed in claim 5, wherein the virtual element representing the control pattern includes at least one of a curve, blocks, a straight line, and a dot.

7. The computer-implemented method as claimed in claim 2, wherein the facilitating the interaction mode between the application and the adult toy comprises:
displaying, by the system, a unique code in the application so as to enable the first user to scan the unique code; and
facilitating, by the system, the interaction mode between the application and the adult toy associated with the first user or the second user instantaneously upon scanning of the unique code using the adult toy management application installed on the user device associated with the first user.

8. The computer-implemented method as claimed in claim 7, wherein the unique code displayed in the application comprises a QR code.

9. The computer-implemented method as claimed in claim 1, further comprising:
receiving, by the system, the at least one action input associated with the virtual object in the application while the virtual object is controlled in the application by at least two users from among the plurality of users of the system during a multi-player interaction mode, the at least two users including the first user; and
sending, by the system, the control pattern associated with a user of the at least two users who performed the at least one action input to each of the users of the multi-player interaction mode, the control pattern enabling each adult toy associated with a respective one of the at least two users to operate under control of the control pattern sent thereto so as to provide the physical stimulus.

10. The computer-implemented method as claimed in claim 1, further comprising:
sending, by the server system, the control pattern to the first user and at least one other user of the system, from among the plurality of users of the system, based at least on receipt of the interaction mode related action performed by the virtual object controlled by the first user, thereby enabling the adult toy associated with each of the at least one other user to vibrate along with the adult toy associated with the first user during the interaction mode.

11. A server system, comprising:
a communication interface;
a memory storing executable instructions; and
a processor operatively coupled with the communication interface and the memory, the processor being configured to, under control of the executable instructions to cause stored in the memory, control the server system to at least execute processes comprising:
facilitating an interaction mode between an application and an adult toy, the adult toy being associated with a first user or a second user from among a plurality of users of the system, and the application being an application installed on a user device associated with the first user;
receiving at least one action input associated with a virtual object in the application, based at least on user input by the first user during execution of the application, each of the at least one action input corresponding to an interaction mode related action performed by the virtual object in the application;
determining a control pattern associated with the interaction mode related action performed by the virtual object in the application, the control pattern being a pattern for controlling operation of the adult toy associated with the first user or the second user, and the control pattern including plural actions sequentially executed over a total run time; and
transmitting the control pattern to the adult toy associated with the first user or the second user, thereby operating the adult toy associated with the first user or the second user to perform the plural actions so as to provide a physical stimulus to the first user or the second user corresponding to the interaction mode related action,
wherein the plural actions of the adult toy associated with the first user or the second user are configured to follow the interaction mode related action performed by the virtual object in the application, and
wherein the control pattern controls one or more parameters related to the total run time, the one or more parameters comprising a loop setting, an intensity, an operating type of the adult toy associated with the first user or the second user, and a unique identifier associated with the adult toy associated with the first user or the second user.

12. The server system as claimed in claim 11, wherein the application comprises an adult toy management application for operating the adult toy associated with the first user or the second user and a game application for providing the interaction mode.

13. The server system as claimed in claim 12, wherein the adult toy management application and the game application are integrated into one application installed on the user device associated with the first user.

14. The server system as claimed in claim 12, wherein the game application comprises a third-party application which provides application programming interfaces (APIs) to the adult toy management application.

15. The server system as claimed in claim 11, wherein:
the processes further comprise displaying a virtual element representing the control pattern on a user interface of the user device associated with the first user, and the virtual element follows the interaction mode related action performed by the virtual object in the application.

16. The server system as claimed in claim 11, wherein the processes further comprise:
   receiving the at least one action input associated with the virtual object in the application while the virtual object is controlled in the application by at least two users from among the plurality of users of the system during a multi-player interaction mode, the at least two users including the first user; and
   sending the control pattern associated with a user of the at least two users who performed the at least one action input to each of the users of the multi-player interaction mode, the control pattern enabling each adult toy associated with a respective one of the at least two users to operate under control of the control pattern sent thereto so as to provide the physical stimulus.

17. The server system as claimed in claim 12, wherein the processes further comprise:
   displaying a unique code in the application so as to enable the first user to scan the unique code; and
   facilitating the interaction mode between the application and the adult toy associated with the first user or the second user instantaneously upon scanning of the unique code using the adult toy management application installed on the user device associated with the first user.

18. A computer-implemented method for operating adult toys based on game related actions, the computer-implemented method comprising:
   facilitating, by a system, an interaction mode between an application and an adult toy from among the adult toys, the adult toy being associated with a first user or a second user from among a plurality of users, and the application being an application installed on a user device associated with the first user;
   receiving, by the system, at least one action input associated with a virtual object in the application, based at least on user input by the first user during execution of the application, each of the at least one action input corresponding to an interaction mode related action performed by the virtual object in the application;
   determining, by the system, a control pattern associated with the interaction mode related action performed by the virtual object in the application, the control pattern being a pattern for controlling operation of the adult toy associated with the first user or the second user, and the control pattern including plural actions sequentially executed over a total run time; and
   transmitting, by the system, the control pattern to the adult toy associated with the first user or the second user, thereby operating the adult toy associated with the first user or the second user to perform the plural actions so as to provide a physical stimulus to the first user or the second user corresponding to the interaction mode related action,
   wherein the plural actions of the adult toy associated with the first user or the second user are configured to follow the interaction mode related action performed by the virtual object in the application, and
   wherein the control pattern controls one or more parameters related to the total run time, the one or more parameters comprising a loop setting, an intensity, an operating type of the adult toy associated with the first user or the second user, and a unique identifier associated with the adult toy associated with the first user or the second user.

19. The computer-implemented method as claimed in claim 18, wherein the application comprises an adult toy management application for operating the adult toy associated with the first user or the second user and a game application for providing the interaction mode.

20. The computer-implemented method as claimed in claim 18, further comprising:
   displaying a virtual element representing the control pattern on a user interface of the user device associated with the first user,
   wherein the virtual element follows the interaction mode related action performed by the virtual object in the application.

* * * * *